N. J. CHAMBERS.
MACHINE FOR SHARPENING SAW TEETH.
APPLICATION FILED APR. 20, 1908.
953,895.
Patented Apr. 5, 1910.
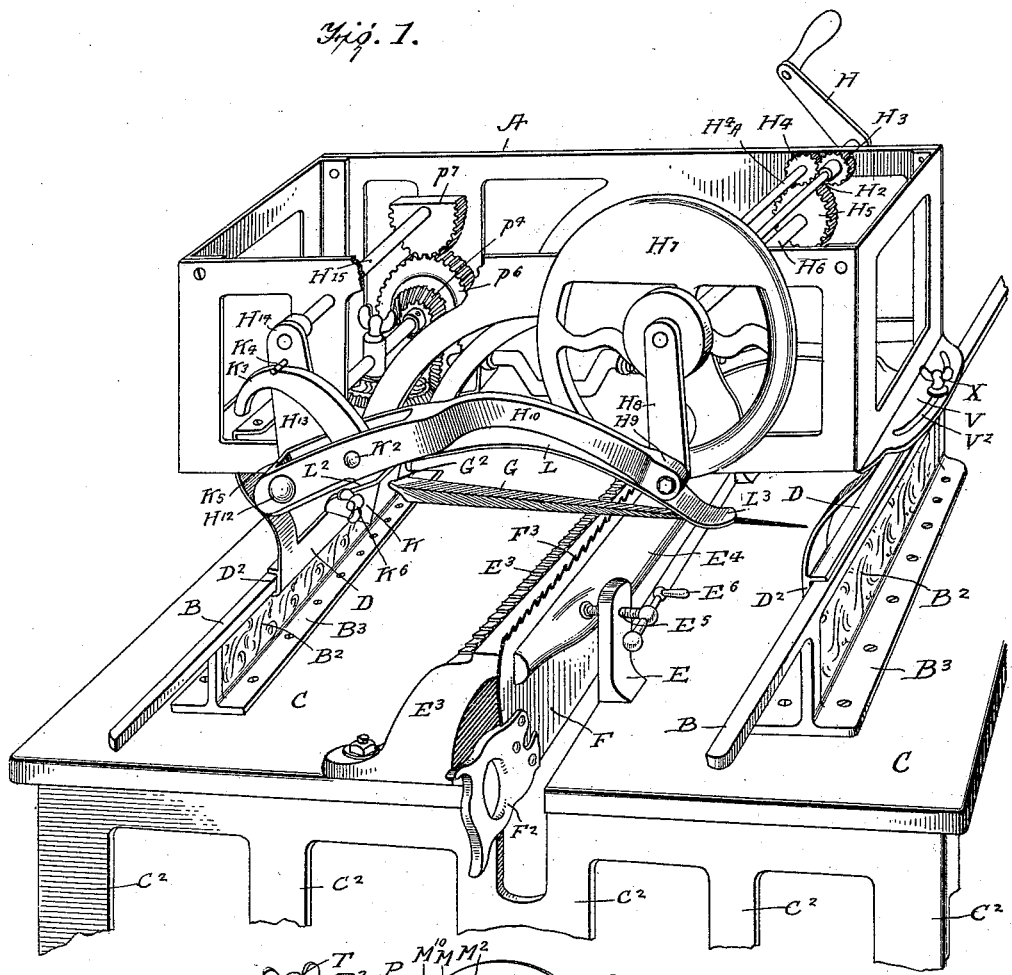
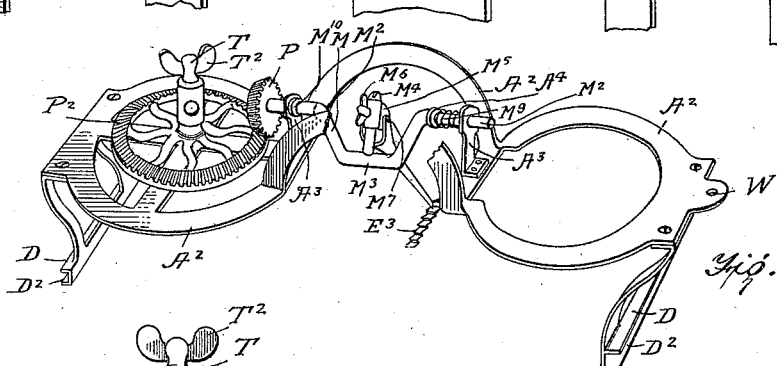
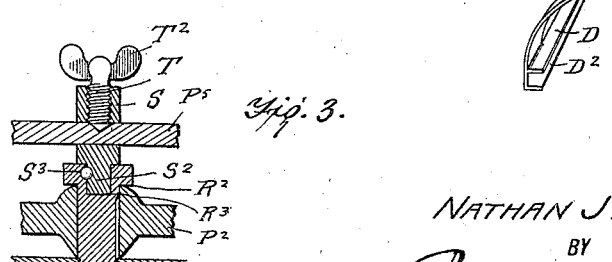
WITNESSES:
INVENTOR
NATHAN J. CHAMBERS,
BY
ATTORNEY

UNITED STATES PATENT OFFICE.

NATHAN J. CHAMBERS, OF CINCINNATI, OHIO.

MACHINE FOR SHARPENING SAW-TEETH.

953,895. Specification of Letters Patent. Patented Apr. 5, 1910.

Application filed April 20, 1908. Serial No. 428,079.

*To all whom it may concern:*

Be it known that I, NATHAN J. CHAMBERS, a citizen of the United States, and a resident of the city of Cincinnati, in the county of Hamilton and State of Ohio, have invented certain new and useful Improvements in Machines for Sharpening Saw-Teeth, of which the following is a specification.

The several features of my invention and the various advantages resulting from their use conjointly or otherwise will be apparent from the following description and claims.

In the accompanying drawing making a part of this specification, and in which similar letters of reference indicate corresponding parts, Figure 1 is a view in perspective of a machine embodying my invention, a portion of the frame being broken away to better disclose the parts of the mechanism which would otherwise be concealed. Fig. 2 is a view in perspective of certain portions of the invention which cannot be fully seen in Fig. 1. Fig. 3 is a vertical section taken in the direction of the length of the frame A and taken through the pivotal connection for enabling the saw sustaining frame to rotate on the frame which carries the file which operates to bring the saw and the file together so that the file shall successively saw the teeth.

I will now proceed to describe my invention in detail.

A is a framework which carries certain portions of the mechanism hereinafter described. This framework is adapted to slide upon suitable guides or rails B. The preferred description of such rails is shown in Fig. 1. These rails are preferably supported as shown by means of the upright or web $B^2$, in turn connected with and supported by the basal portion $B^3$. Each of these basal portions $B^3$ rests upon a suitable table C, having legs or other proper supports $C^2$.

A convenient conformation of guides is shown. Each of these guides D is provided with a recess $D^2$. Each recess is received in its adjacent guiding rail B and is slidable thereon. The framework A is duly connected to the guides D. All of the mechanism which is carried by these guides is therefore slidable upon the guiding rails or supports B.

At the middle of the table C is located a clamp E. One side $E^2$ of this clamp is provided with a ratchet $E^3$, and the opposing jaw $E^4$ of the clamp is duly forced toward the corresponding side $E^2$ by a suitable eccentric or screw, preferably the latter, shown as $E^5$. This screw is rotated by a wheel or lever $E^6$. The screw $E^5$ engages a thread in the standard $E^7$ of the clamp, which standard is fixed to the table or equivalent support. Between this clamping jaw $E^4$ and the clamping jaw $E^2$ is the blade F, having handle $F^2$ and the teeth $F^3$. Although I have shown one kind of saw within the clamping jaws, nevertheless it must be understood that my invention is applicable to saws of other shapes and of other kinds,—it being only necessary to clamp the blade of a saw so that it shall be capable of being acted upon by the sharpener G hereinafter more particularly described.

There are four functions which my machine performs, to wit: One function is that of applying the sharpener G to the saw teeth and of reciprocating the sharpener so as to sharpen the tooth with which it comes in contact. The second function is that of raising the sharpener away from the tooth, in readiness to be applied to a second tooth. The third function is of one whereby, by proper mechanism, the sharpener G is moved from one toothed jaw which has been sharpened to the next one in order which requires to be sharpened. The fourth function is a capacity with which I have endowed the machine whereby the sharpener can be set at an angle to the plane of the saw blade so that the teeth can be sharpened at a bevel.

Power applied to operate the invention may be of any desired kind. In the present illustrative instance, power is applied by hand through the medium of a crank H. In case other power were employed, there would be substituted for the crank, gear wheel or the like. The crank H is fixed to the shaft $H^2$, duly journaled in the frame A. On this shaft $H^2$ is fixed a gear wheel $H^3$ which in turn engages with a gear wheel $H^4$ fixed on the shaft $H^{4A}$ journaled in the said frame A. This gear $H^4$ in turn engages with a gear wheel $H^5$ on the shaft $H^6$, to which shaft is attached a balance or fly wheel $H^7$. To this shaft $H^6$ is also connected a crank $H^8$, whose free end is pivotally connected at $H^9$ to one end of a connecting rod $H^{10}$, whose other end is pivotally connected by a pivot $H^{12}$ to the free end of an oscillating arm $H^{13}$. The other end of this arm $H^{13}$ is duly fixed at $H^{14}$ upon a shaft $H^{15}$, which shaft is journaled in the supporting frame.

A holder K for the file G is provided, and this holder is pivoted at $K^2$ to the connecting rod $H^{10}$. This holder K is further provided with an extension or arm $K^3$ which at certain portions of its movement is adapted to impinge against a stud $K^4$ fixed in the arm $H^{13}$, substantially as shown. In order to enable the arm $K^3$ and the holder K to put less strain upon pivot $K^2$, and to be more securely steady in their operations, I prefer to make the adjacent end portion of the connecting rod $H^{10}$ wide and in this widened part provide a slot $K^5$. In this slot $K^5$, I locate the arm $K^3$ and cause the pivot $K^2$ to extend through one portion of the connecting rod $H^{10}$ and thence through the arm $K^3$ and through the other opposite portion of the connecting rod $H^{10}$, in order that the file may be capable of a rotatory adjustment, which capability is, obviously to any expert in the business of saw sharpening, very desirable. I provide the set screw $K^6$ whose end is adapted to set a part of that portion of the shank $G^2$ of the file G which is within the holder K. By loosening the set screw $K^6$, the file which is preferably a three-cornered one, may be rotated as desired, and then the set screw $K^6$ is tightened and the file securely set at the desired point of rotation. In connection with the connecting rod $H^{10}$, I locate a spring L preferably fastened at $L^2$ to the connecting rod $H^{10}$. This spring L extends forward and under that end of the connecting rod $H^{10}$ which is pivoted at $H^9$ to the crank arm H. It also extends still farther out from the bearing portion $L^3$, which latter is adapted to bear upon the file G. Of course the spring L might be made shorter and brought down upon the file sooner, but I prefer to make the spring of a length substantially as shown, and cause it to impinge against the file at the point indicated in Fig. 1.

The operation of the mechanism thus far described is substantially as follows;—it being understood that some means are employed to cause the file after filing one tooth accurately, to enter the adjacent tooth and so on to file the successive teeth of the saw until all of the teeth have been duly filed and sharpened. As the shaft $H^2$ is revolved by power, the rotation of the gear $H^3$ will rotate the gear $H^4$ and the gear $H^4$ will in turn rotate the gear $H^5$ and the shaft $H^6$, and thereby the fly or balance wheel $H^7$ will be rotated and the crank arm $H^6$ will be caused to move its free end, describing a circle. This free end of the crank arm $H^6$ will carry with it the connecting rod $H^{10}$ as it moves forward. As the crank arm $H^6$ moves forward it will operate to lift the adjacent end of the connecting rod $H^{10}$ and carry the same with it up and around in a circle in which it (the crank arm) describes. As the crank arm $H^8$ is reaching the upper portion of the circle which it describes, the pivot $K^2$ with the connecting rod $H^{10}$ will raise the arm $K^3$ sufficiently so that it will impinge against the stud $K^4$, the arm $K^3$ being stopped in its upward movement, and the pivot $K^2$ still rising in connection with the connecting rod $H^{10}$ will cause the file connected to the holder K which in turn, as we have seen, is connected rigidly to the arm $K^3$, to rise away from and out of the notch in the saw between adjacent teeth wherein the file has been acting and will hold it up above and away from the saw teeth for a short period of time. During the absence of the pawl from the saw, the saw will be moved one tooth forward in readiness for the file to enter the next notch in the saw. As the arm $H^8$ continues to revolve, it gradually descends toward the lower part of the stroke and carries with it the holder K and the file G, which latter now enters that notch in the saw which is directly below it (the file). As the arm $H^8$ continues to move forward, it draws the connecting rod forward, and with it moves the file forward through the notch in the saw, which file operates to sharpen the adjacent tooth or teeth, as the case may be. The file is kept down in accurate position for successful and perfect operation by means of the spring L, which, during this operation of the file, bears upon the same and keeps it properly pressed against the saw tooth while the file is operating upon said tooth. It is of course obvious that the connecting rod $H^{10}$ is capable of this reciprocating movement, because it is pivoted at $H^{12}$ to the swinging arm $H^{13}$ already mentioned. This operation is repeated in connection with each new saw tooth until all of the teeth of the saw which need sharpening have been sharpened.

It is of course very desirable that in connection with the mechanism just described for sharpening the teeth there shall also be present some mechanism for causing the file when lifted, in case the saw itself is stationary, to be moved one tooth forward so as to engage the next notch of the saw and file the next tooth thereto. Or in case the file itself should be stationary as regards the lateral movement of it, the clamp which holds the jaws should be arranged so that it should move the saw one tooth forward at a time so that the successive teeth of the saw shall be successiveyl fed to the file to be sharpened. One form of such mechanism I am now prepared to describe but I wish it to be understood that this mechanism is applicable, by obvious and simple changes, so as to cause either the frame carrying the mechanism already described which operates the file and the file forward while the saw is stationary, or to cause the clamp holding the saw to be moved forward under the file and across the length of the latter so as to enable the said file to file successive teeth in the saw. Later in this specification, I will suggest the obvious change which could be made, which is obviously comprehended in not only the spirit of my invention but within the obvious equivalent changes which will enable the invention to be thus carried out.

In order to enable the file to move relatively to the stationary saw so as to successively engage the successive saw teeth, I have provided, as aforesaid, as the preferable embodiment of this part of my invention, the guide rails B and the guides D sliding thereupon. To these guide rails D are respectively connected the adjacent respective ends of the lower portion $A^2$ of the frame A. This frame portion $A^2$ is provided with uprights (journal bearings) $A^3$, $A^3$, which respectively receive the journals $M^2$ of the crank arm M. This crank arm is pivotally connected to a pawl N. This crank arm M is arranged to oscillate back and forth, and as it oscillates in one direction, it draws the pawl N backward so that the pawl N shall enter one tooth of the ratchet $E^3$, and as it oscillates in the opposite direction it pushes against the said pawl and forces the part $A^2$ to be moved one tooth or ratchet $E^3$ forward. As the frame A, $A^2$ carries the file G, of course the file is correspondingly moved and carried forward from one notch of the saw out of which it has been lifted to the next notch of the saw into which it is dropped, to file the tooth of the same. The preferred means for effecting the oscillation of this crank arm M is as follows:—There is connected to one of the journals $M^2$ of the crank arm a beveled gear wheel P which in turn meshes with a beveled gear wheel $P^2$ rotatable on a shaft R, which shaft R is fixed to the frame $A^2$. The gear wheel $P^2$ in turn meshes with a gear wheel $P^4$, turning loosely on shaft $P^5$ fixed in a vertical portion of the shaft R. This gear wheel is fixed to the larger gear wheel $P^6$ which in turn meshes with the gear wheel or sector of the gear wheel $P^7$. This latter wheel $P^7$ is mounted on a shaft $H^{15}$ which wheel, it will be recollected, is fixed to the oscillatory arm $H^{13}$. The mode in which this portion of the mechanism operates is as follows:—As the oscillatory arm $H^{13}$ is moved back and forth through the agency of the connecting rod $H^{10}$ and rotating crank arm $H^8$, the gear $P^7$ will be caused to oscillate with the oscillatory arm $H^{13}$. This movement of the gear $P^7$ will be communicated to gear $P^6$, which latter in turn will operate gear $P^4$ engaging gear $P^2$. This last named gear $P^2$ will in turn operate the gear wheel P, which latter will move the oscillatory crank arm M of the pawl N. Thus when the connecting rod $H^{10}$ is moved toward the left, and the file G has been lifted out of contact with the saw, the free end of the oscillatory arm $H^{13}$ will likewise be moved toward the left, and the movement communicated through shaft $H^{15}$ and the gear wheels mentioned will cause the crank arm wrist $M^3$ to move away from the spectator, and thereby, by means of the pawl N fixed in a notch of the ratchet $E^3$ to move the frame A and its mechanism toward the spectator and place the file G over a new notch to be filed in the saw. Again, when the connecting rod $H^{10}$ is moved toward the right, and the file G has entered one of the notches of the saw and being duly pressed down by the spring $L^3$, is filing one of the teeth, the free end of the oscillatory arm $H^{13}$ moving toward the right, and the shaft $H^{15}$ is thereby rotated in a like direction, the gear wheel $P^7$ through the agency of the gears $P^6$, $P^4$, $P^2$, P, will move the wrist $M^3$ of the crank M toward the spectator, thereby drawing the pawl N in a like direction and causing the point of this pawl to move out of one of the teeth of the ratchet $E^3$ and into the adjacent one. These operations thus described are successively repeated in turn until the file has duly sharpened the teeth of the saw. Then the operation of the machine is stopped, and the saw is withdrawn from the clamp.

In so much as the teeth of different saws vary in their distances apart, it becomes necessary in order to make my machine capable of automatically filing said teeth to adapt it to the distance the machine is fed forward to the respective distances the teeth of the saw to be filed are apart. This adjustment of the length of the feed may be effected in various ways, but is preferably accomplished as follows:—On the wrist $M^3$ of the crank M, I locate a stud $M^4$ fixed to the said wrist. On this wrist I locate a slidable piece $M^5$ which latter can be set at any desired point along the length of this stud $M^4$ by means of the set screw $M^6$. To this slidable piece $M^5$ is pivotally connected a pivot $M^7$. When the slidable piece $M^5$ is located on the stud $M^4$ near the wrist $M^3$, the longitudinal movement of the pawl N will be short and this movement of the pawl N will be lengthened more and more according as the slidable piece $M^5$ is located nearer and nearer to the free end $M^4$, that is farther and farther away from the wrist $M^3$. Obviously, therefore, the distance that the machine is fed forward is readily determined by the proper adjustment of the connection $M^5$ of the pawl N of the stud $M^4$ of the crank wrist $M^3$. Before leaving this part of the device, it will be observed that a convenient mode of preventing the crank arm from slipping in the direction of the length of its journals $M^2$ is as follows:—In one of the journal bearings $A^3$ I locate a pin $M^8$ which prevents the crank arm from sliding toward the gear wheel $P^2$. On the other journal M², between the journal bearing A³ and the flange A⁴ of the said journal, I locate a spring M⁹, whose function is to continually press the crank M in the direction of the journal bearing A³. Collar M¹⁰ is present between journal bearings A³ and pin M⁸ to prevent pin M⁸ bearing against bearing A³.

It now remains to describe the preferred mechanism for enabling the length of the file to be located at an angle to the length of the saw, so that all classes of teeth may be obliquely filed in accordance with the well known shape of said teeth. It is to be understood that the frame A² moves with its fixed guides D, D, upon the rails B without change of direction of its length relatively to the length of the rails. But the frame A, directly carrying the gears H³, H⁴, H⁵, and their respective shafts and the balance wheel H⁷, crank arm H, connecting rod H¹⁰ and spring L³ and file G, its holding block K, arm K³, oscillatory arm H¹³, shaft H¹⁵, gear P⁷, gear P⁶, gear P⁴, shaft P⁵, is rotatable relatively to the frame A² and the mechanism which the latter carries, as shown in Fig. 2, by being duly pivoted upon or in connection with the said frame A². The preferred mode of such pivotal connection is shown in the drawings and is as follows:—The frame A² carries the vertical shaft R extending upward. This shaft R is the axle or pivot on which and around which the gear wheel P² turns. The upper end of this shaft R is provided with an enlargement or flange R² which overlaps the hub of the gear wheel P². Thus this gear wheel P² is held securely between the frame below and the collar or enlargement R² above. The upper end of this shaft R is provided with a recess R³. This recess receives the diminished end S² of a standard S. Through this standard S passes a shaft P⁵, on which, it will be recollected, the gear wheels P⁴ and P⁶ are rotatable. This shaft is prevented from slipping longitudinally through the standard S by means of a set screw T screwed through an opening in the upper end of the standard S and provided with a thumb piece or its equivalent T². This set screw duly enters a proper notch in the shaft P⁵ and thus prevents the latter from slipping lengthwise. The standard S is prevented from accidentally rising up and out of the shaft R by means of a pin S³ which, as shown, locks the standard to the axle, the said pin fitting into a semi-circular notch in the axle and a semi-annular notch or groove in the standard S. As the shaft P⁵ is at each end duly fixed in their respective adjacent sides of the shaft, it is a part of the frame.

The entire frame A and what it carries, as aforesaid, is pivotally connected to the frame A² by the standard S, which is capable of a limited rotation sufficient to enable the right hand end of the frame A to be moved in an arc of a circle far enough to give the file any necessary inclination relatively to the length of the saw. This right hand end of the frame A rests upon the right hand portion of the frame A² and is slidable thereon. In order to set this frame A firmly at the desired angle relatively to the frame A², I provide the frame A with a flange V, and in this flange V I form a slot V². Through this slot V² and through the hole W of the frame A², I pass a bolt X. This bolt is screwed into a screwthreaded hole W in the frame A². By loosening the bolt, the frame A can be moved upon the frame A² so that the length of the file G shall make a right angle with the length of the saw, so that the saw may saw the teeth at the proper angle. The said nut X is then tightened and the frame A is secured in position.

Obviously the saw clamp might be provided with the guides D² running upon rails B, thus enabling the saw clamp to be moved back and forth lengthwise, instead of the frame A², with its guides D, sliding upon the rails B. In this event, the pawl N will push the saw along in the opposite direction from what it would have pushed the frame A² along when the frame A² is movable and the saw stationary. But the principle of operation is evidently that of my invention, and I wish it to be understood as included within this feature of my invention.

What I claim as new and of my invention and desire to secure by Letters Patent, is:—

1. In a machine of the kind described, the combination with a saw clamp, of a frame slidably mounted over said clamp, shafts mounted in said frame, a crank carried by one of said shafts, and an arm carried by the other, a rod connecting said arm to said crank, a spring member carried by said rod, a file holder carried by said rod under said spring, means for operating the rod with the crank, and means operated by the rod with the arm for moving said frame in respect to the clamp.

2. In a machine for filing saws, the combination with a saw clamp provided with a ratchet portion, of a frame slidably mounted over said saw clamp, shafts mounted in said frame carrying arms, a rod connecting said arms, a file carrier mounted on said rod, means for operating one of said arms, and means operated by the shaft of the other arm for engaging said ratchet portion for moving said frame.

3. In a machine of the kind described, the combination with a saw clamp provided with a ratchet portion, of a frame slidably mounted over said saw clamp, a file holder mounted above said saw clamp, upon arms carried by shafts mounted in the frame, means for reciprocating said file holder, together with a crank shaft carrying a pawl for engaging said ratchet portion, said crank shaft being operated by one of said shafts.

4. In a machine of the kind described, the combination with a table provided with guide-rails, of guides provided with recesses slidably mounted on said rails, a frame adjustably mounted on said guides, a saw clamp arranged on said table between said guides provided with a ratchet portion, an operating shaft mounted in said frame at one end, a crank fixed on one end of said shaft, an oscillating shaft mounted in said frame at the other end provided with an arm, a rod having its ends pivotally connected to the said crank and arm and provided with a bifurcated portion, a file holder pivotally mounted in the bifurcation of said rod adjacent said arm, an arm carried by said holder adapted to engage a stud projecting outwardly from said arm carried by the oscillating shaft, a spring carried by said rod for engaging the file in the holder, and a crank carrying a pawl for engaging said ratchet portion of the clamp, said crank being operated by the oscillating shaft through a medium of gearing.

NATHAN J. CHAMBERS.

Attest:
WM. HARTHY PUGH,
K. SMITH.